(12) United States Patent
Cole et al.

(10) Patent No.: US 7,736,099 B2
(45) Date of Patent: Jun. 15, 2010

(54) GEAR MILLING TOOL WITH REPLACEABLE CUTTING INSERTS

(75) Inventors: John M. Cole, Oxford, MI (US); Robert D. Kranker, Rochester, MI (US)

(73) Assignee: Cole Carbide Industries, Inc., Warren, MI (US)

( * ) Notice: Subject to any disclaimer, the term of this patent is extended or adjusted under 35 U.S.C. 154(b) by 1065 days.

(21) Appl. No.: 11/305,467

(22) Filed: Dec. 16, 2005

(65) Prior Publication Data

US 2007/0140798 A1 Jun. 21, 2007

(51) Int. Cl.
*B23B 1/00* (2006.01)
*B23B 5/20* (2006.01)

(52) U.S. Cl. .......................... 407/66; 407/67; 407/113; 407/35

(58) Field of Classification Search ......... 407/113–116, 407/30, 66, 103, 48, 40, 53, 33, 34, 64, 35, 407/67
See application file for complete search history.

(56) References Cited

U.S. PATENT DOCUMENTS

| 1,964,130 | A | * | 6/1934 | Miller ......................... 407/41 |
| 3,961,403 | A | | 6/1976 | Hunkeler |
| 4,038,732 | A | | 8/1977 | Hunkeler |
| 4,060,881 | A | | 12/1977 | Ryan et al. |
| 4,575,286 | A | | 3/1986 | Blakesley |
| 4,621,954 | A | | 11/1986 | Kitchen et al. |
| 5,477,755 | A | * | 12/1995 | Blakesley et al. .......... 76/101.1 |
| 5,782,589 | A | | 7/1998 | Cole |
| 6,311,590 | B1 | * | 11/2001 | Stadtfeld ..................... 82/1.11 |
| 6,609,858 | B1 | | 8/2003 | Francis et al. |
| 7,326,006 | B2 | * | 2/2008 | Hecht et al. ................... 407/48 |

FOREIGN PATENT DOCUMENTS

SU 1720804 A1 3/1992

OTHER PUBLICATIONS

Book of Large Assembly Cutting Tool Constructions for Heavy and Unique Lathes, Turning Mills, and Metal-Planing Machines, Moscow, CBTI, 1955, pp. 43-45.
Official Action issued Oct. 7, 2009, by the Patent Office of the Russian Federation re Russian Patent Application No. 2008129075, with English translation.

* cited by examiner

*Primary Examiner*—Willmon Fridie
(74) *Attorney, Agent, or Firm*—Harness, Dickey & Pierce, P.L.C.

(57) ABSTRACT

A cutting tool assembly adapted to be coupled to a cutter head for manufacture of a gear. The cutting tool assembly includes a cutting insert and a holder adapted to couple the cutting insert to the cutting head. The holder includes a pocket defined by a back surface and at least one lip member that provides a force directed against the cutting insert toward the back surface to thereby retain the cutting insert within the pocket during cutting operations.

18 Claims, 4 Drawing Sheets

GEAR MILLING TOOL WITH REPLACEABLE CUTTING INSERTS

FIELD OF THE INVENTION

The present invention relates to gear milling tools and, more specifically, to gear milling tools with replaceable cutting inserts.

BACKGROUND OF THE INVENTION

Gear milling tool assemblies have been developed for the manufacture of gears, such as bevel and hypoid gears with curved flank lines. Many face mill cutter assemblies, for example, include a disk-shaped cutter head that attaches to the milling machine and a plurality of cutting blades that are coupled to the cutter head. The cutting blades are arranged about a center point of the cutter head at varying radial positions. The cutting blades are arranged in groups, with usually two or three cutting blades per group. In two-blade groups, the blade pair comprises an inner cutting blade and an outer cutting blade. In the three-blade group, a "bottom" cutting blade is included with the inner and outer cutting blades. Typically, one tooth slot is formed in the work piece with each plunge of the cutter assembly. The cutter assembly is then withdrawn, and the work piece is indexed to the next tooth slot position in order to form the next tooth slot as is widely known in the art.

During typical face hobbing processes, the cutter and the work piece rotate independently in a timed relationship with each other, thereby allowing continual indexing of the work piece and continual formation of each tooth slot of the gear. Each successive group of cutting blades passes through successive tooth slots with each blade in the group forming a cut completely along the longitudinal portion of the tooth slot. Thus, in most face hobbing processes, a single plunge of the cutting tool results in all tooth slots of the work piece being formed.

In many prior art gear milling tool assemblies, the cutting blades are elongate stick-type members that are disposed in slots in the disk-shaped cutter head. The cutting blades are typically made from bar stock high speed steel (HSS). To form a gear within high tolerances, it is preferable if each of the cutting blades are uniform. However, after prolonged use of the gear milling tool assembly, one or more of the cutting blades wear, and the cutting blades typically require sharpening. However, sharpening the cutting blades can be time-consuming and costly.

U.S. Pat. No. 6,609,858 to Francis et al. discloses a gear hobbing cutter system with a cutter head body that receives a plurality of supporting blocks (i.e., holders). Each of the holders includes a pocket that receives a cutting insert. The cutting insert is indexable to at least two cutting edges. When one of the cutting edges becomes worn, the cutting insert can be indexed for use of the sharper cutting edge, thereby possibly providing cost savings.

One drawback of the device of the Francis et al. '858 patent, however, is that the cutting inserts may not be adequately supported within the pocket of the respective holder. Forces generated during the formation of a gear may shift the cutting insert relative to the supporting block, thereby causing the work piece to be out of tolerance. For instance, the pocket of the holders is substantially open on one side—the side facing the head of the fastener. Because this side is open, the cutting insert may not be adequately supported and the cutting inset may shift out of tolerance, especially considering the high loads on the cutting insert during the gear manufacturing process.

Accordingly, there remains a need for an improved gear milling tool assembly with a holder that receives a cutting insert. More specifically, there remains a need for an improved gear milling tool in which the cutting inserts are better supported by the holder.

SUMMARY OF THE INVENTION

The aforementioned needs are addressed in the cutting tool assembly of the present invention. The cutting tool assembly is adapted to be coupled to a cutter head for manufacture of a gear. The cutting tool assembly includes a cutting insert and a holder adapted to couple the cutting insert to the cutting head. The holder includes a pocket defined by a back surface and at least one lip member that provides a force directed against the cutting insert toward the back surface to thereby retain the cutting insert within the pocket during cutting operations.

In another aspect, the present invention is a cutting tool assembly adapted to be coupled to a cutter head for manufacture of a gear. The cutting tool assembly includes a cutting insert with a back surface and at least one angled surface intersecting the back surface at an acute angle. The cutting tool assembly also includes a holder adapted to couple the cutting insert to the cutter head and includes a pocket defined by a back surface and at least one angled surface intersecting the back surface of the pocket at an acute angle. The back surface of the pocket supports the back surface of the cutting insert. The angled surface of the pocket supports the angled surface of the cutting insert by providing a force directed against the cutting insert toward the back surface to thereby retain the cutting insert within the pocket during cutting operations.

In another aspect, the present invention is a gear milling tool assembly that includes a cutter head and a plurality of cutting inserts. Each of the cutting inserts includes a back surface and at least one angled surface intersecting the back surface at an acute angle. The gear milling tool assembly also includes a plurality of holders, each with a pocket defined by a back surface and at least one angled surface intersecting the back surface of the pocket at an acute angle. Each of the holders couples one of the cutting inserts to the cutter head. The back surface of each of the pockets supports a corresponding one of the back surfaces of the cutting inserts. Each of the angled surfaces of the pockets supports a corresponding one of the angled surfaces of the cutting inserts by providing a force directed against the corresponding cutting insert toward the back surface to thereby return the cutting insert within the pocket during cutting operations.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
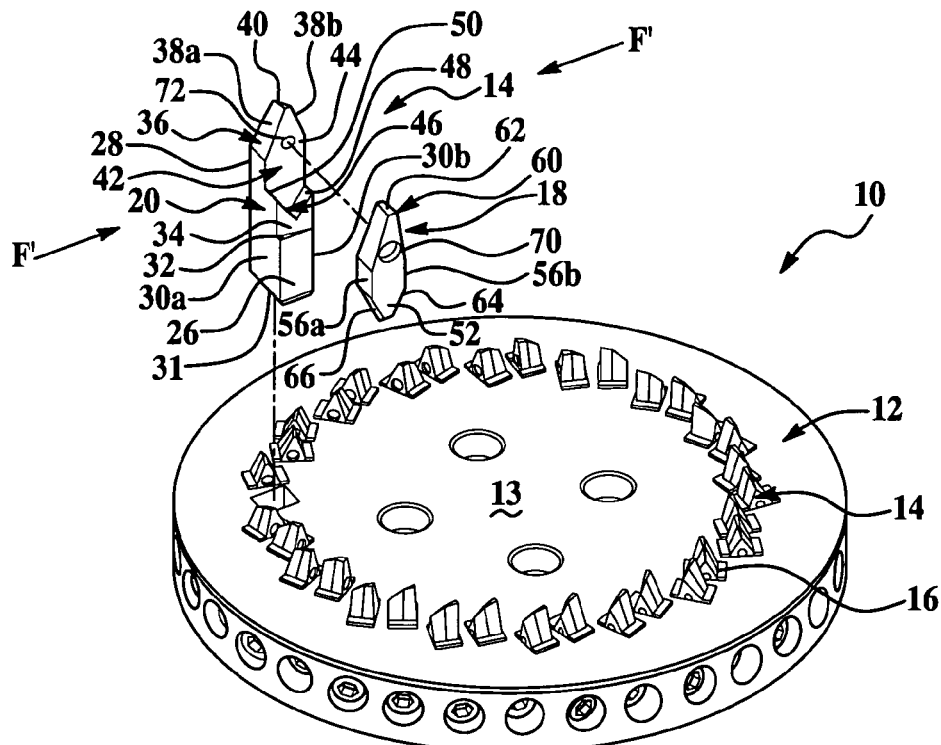
FIG. 1 is an exploded view of a gear milling tool of the present invention.

Referring now to the figures, and in particular FIG. 1, a gear milling tool assembly of the present invention is generally indicated at 10. The gear milling tool assembly 10 generally includes a cutter head 12 with an upper surface 13 and a plurality of cutting tool assemblies generally indicated at 14. The cutter head 12 includes a plurality of slots 16 arranged about a center point on the upper surface 13 of the cutter head 12 at varying radial positions. Each slot 16 receives one cutting tool assembly 14. The cutter head 12 is adapted to be attached to a mill or other suitable machine (not shown) for forming a gear. The cutting tool assemblies 14 are arranged in two-blade groups, each having an "inner" and an "outer" for cutting the inner and outer side of the gear tooth, respectively. As generally known in the art, the mill rotates the cutter head 12 and moves the cutting tool assemblies 14 into a work piece (not shown) to form the gear. Those having ordinary skill in the art will appreciate that the gear milling tool assembly 10 could have any number of cutting tool assemblies 14 arranged in any suitable manner on the cutter head 12 without departing from the scope of the invention.

As shown, the cutting tool assemblies 14 each include a cutting insert 18 and a holder 20. The holder 20 couples the cutting insert 18 to the cutter head 12 with an upper surface 13 in a manner to be described in greater detail below. The cutting insert 18 is preferably removably attached to the holder 20. Those having ordinary skill in the art will appreciate that the cutting insert 18 can be removed from the holder 20 to be sharpened. The cutting inserts 18 can be sharpened separately from the holders 20. In one embodiment, the cutting inserts 18 can be removed from the holders 20 while the holders 20 remain coupled to the cutter head 12. The cutting inserts 18 can be disposed of and newly sharpened cutting inserts 18 can be attached to the holders 20. Several aspects of the cutting tool assemblies 14 enable the cutting inserts 18 to be better supported by the holders 20 as will be discussed in greater detail below.

Figure 2:
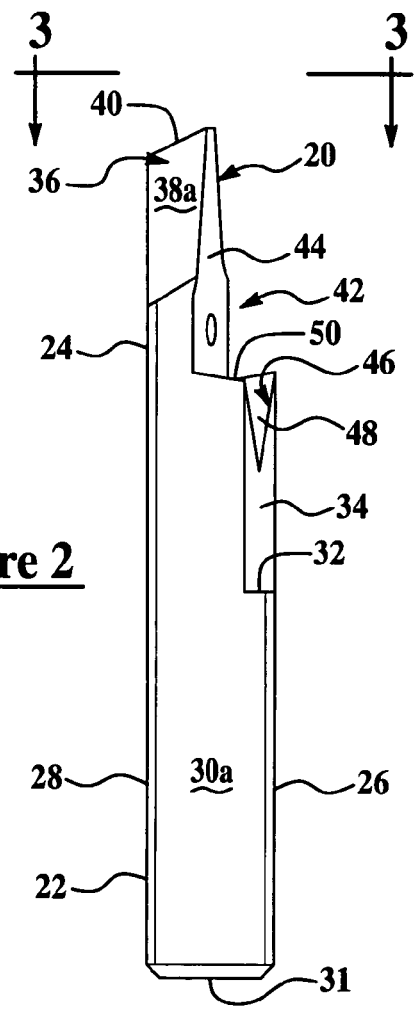
FIG. 2 is a side view of a holder for the gear milling tool of FIG. 1.
Figure 3:
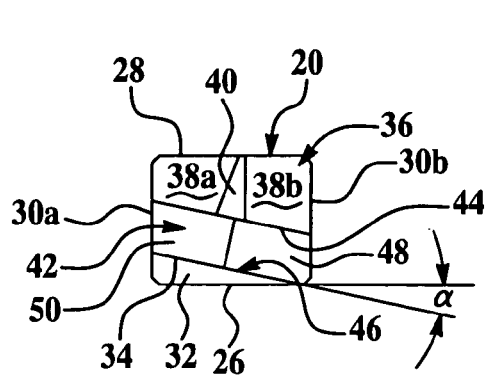
FIG. 3 is a top view of the holder for the gear milling tool of FIG. 1.

One embodiment of the holder 20 is shown in detail in FIGS. 1-3, 5A and 5B. The holder 20 is generally elongate so as to define a first end 22 and a second end 24. The first end 22 of the holder 20 generally includes a front surface 26, a back surface 28, opposing side surfaces 30a, 30b, and a bottom surface 31. Edges where the front, back, side and bottom surfaces 26, 28, 30, 31 intersect can be chamfered. The first end 22 is adapted to be inserted within one of the slots 16 of the cutter head 12 for coupling to the cutter head 12. The back surface 28 and the side surfaces 30a, 30b continue up to second end 24 of the holder 20, but the front surface 26 is interrupted by a ledge 32 cut perpendicularly to the front surface 26 of the first end 22 of the holder 20. The second end 24 of the holder 20 also includes an angled front surface 34. As shown in FIG. 3, the front surface 34 of the second end 24 of the holder 20 is disposed at an acute angle $\alpha$ relative to the front surface 26 of the first end 22 of the holder 20. The second end 24 of the holder 20 also includes a top ridge 36. In the embodiment shown, the tapered ridge 36 has an inverted V-shape that intersects both the side surfaces 30a, 30b. As such, the top ridge 36 defines two angled top surfaces 38a, 38b. The top ridge 36 is also truncated so as to define a top surface 40. In the embodiment shown, the angled top surfaces 38a 38b and the top surface 40 are each tapered down toward the back surface 28 of the holder 20 as shown in FIG. 2. The holder 20 can be made from rectangular and/or square bar stock of a hard metal, such as high speed steel.

Figure 5A:
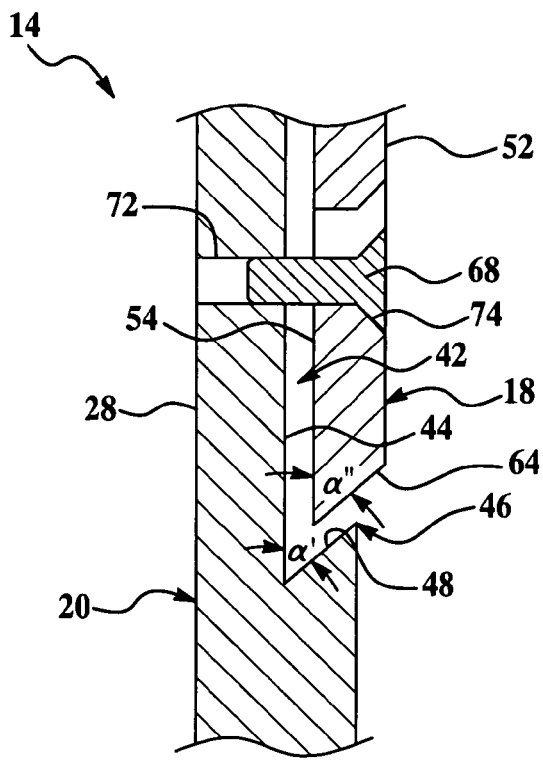
FIG. 5A is a cross section of the cutting insert coupling with the holder.
Figure 5B:
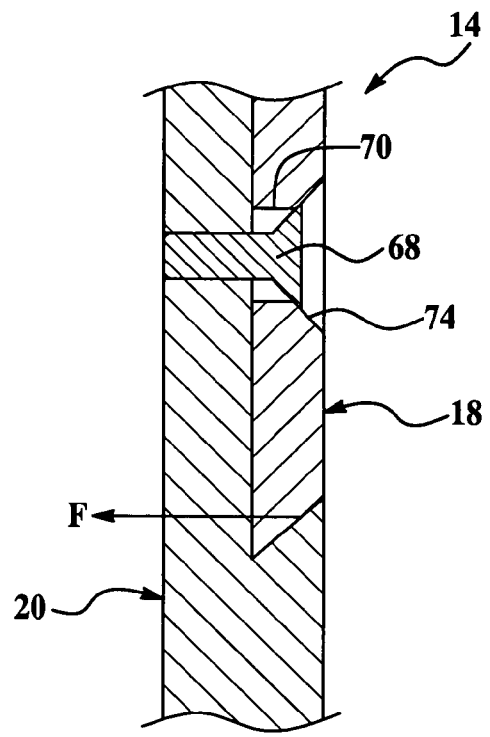
FIG. 5B is a cross section of the cutting insert coupled to the holder.
Figure 6:
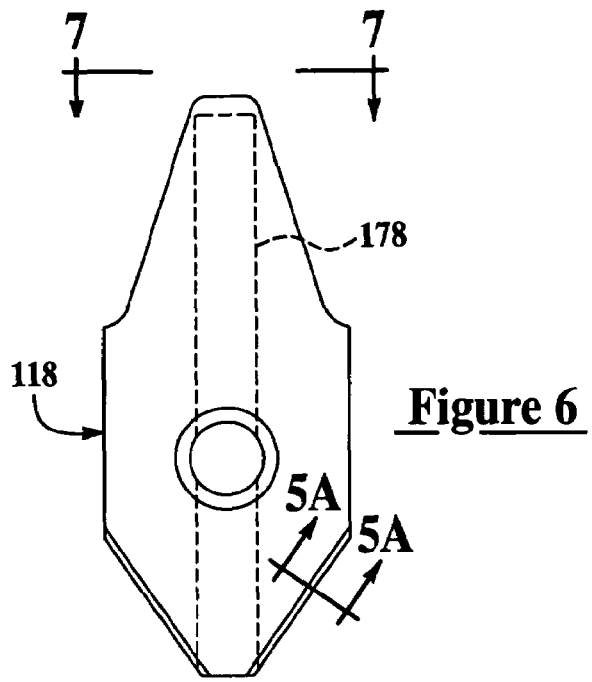
FIG. 6 is a front view of another embodiment of the cutting insert of the present invention.
Figure 7:
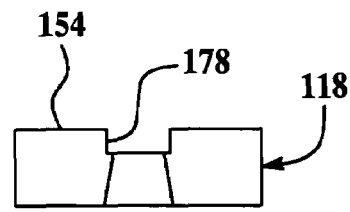
FIG. 7 is a top view of the cutting insert of FIG. 6.
Figure 8:
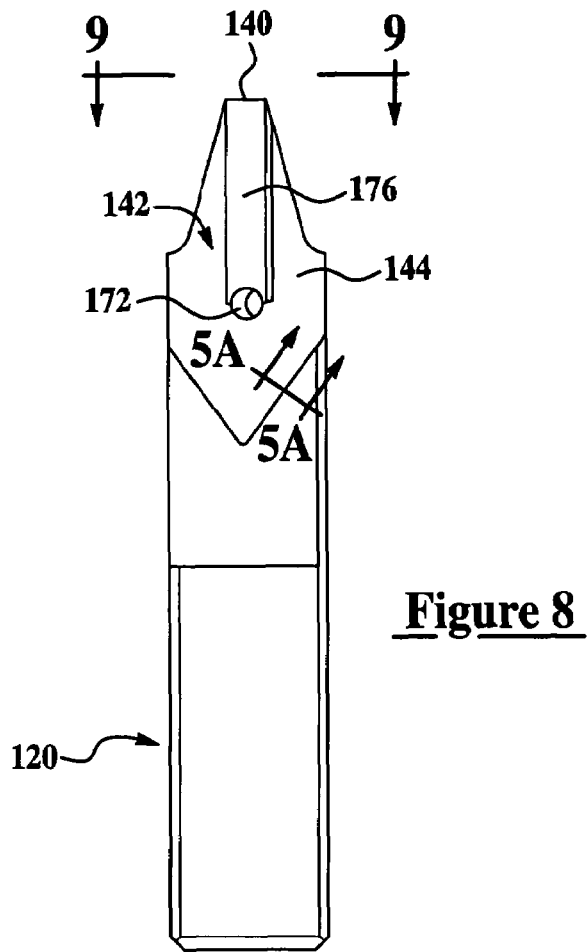
FIG. 8 is a front view of another embodiment of the holder of the present invention.
Figure 9:
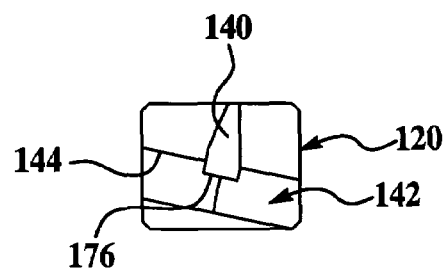
FIG. 9 is a top view of the holder of FIG. 8.
Figure 10:
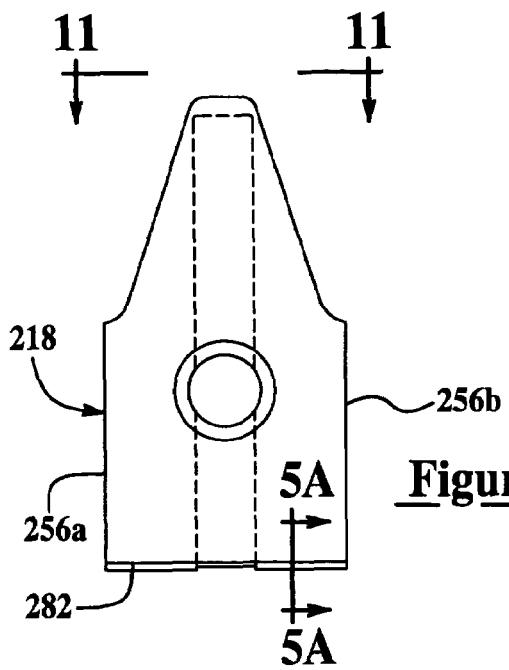
FIG. 10 is front view of another embodiment of the cutting insert of the present invention.
Figure 11:
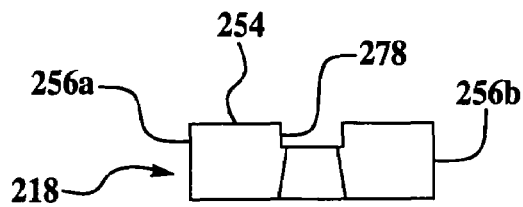
FIG. 11 is a top view of the cutting insert of FIG. 10.
Figure 12:
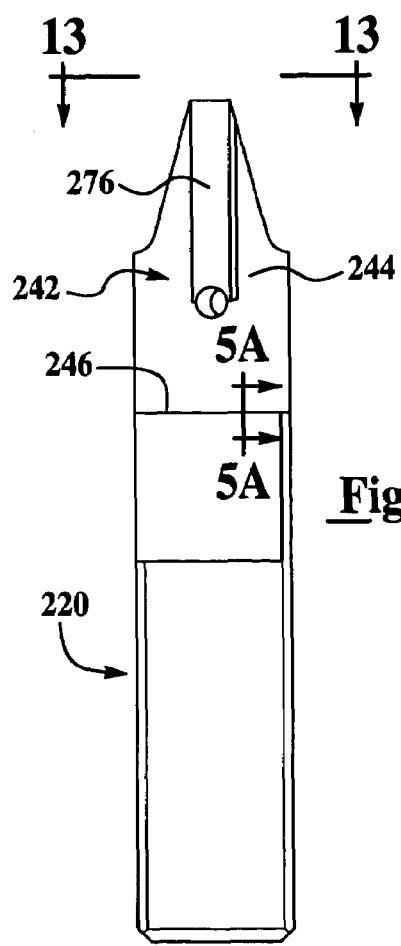
FIG. 12 is a front view of another embodiment of the holder of the present invention.
Figure 13:
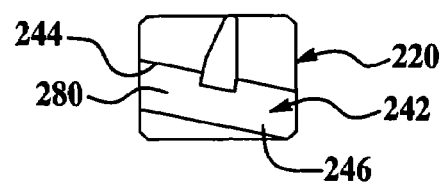
FIG. 13 is a top view of the holder of FIG. 12.

The second end 24 of the holder 20 also includes a pocket generally indicated at 42. In the embodiment shown, the pocket 42 is defined by a back surface 44, which is substantially parallel to the angled front surface 34. The pocket 42 is further defined by at least one lip member generally indicated at 46. In the embodiment shown, the lip member 46 includes a first angled surface 48 and a second angled surface 50. FIGS. 5A and 5B schematically illustrate the first angled surface 48 in cross-section. It should be appreciated that the second angled surface 50 appears the same in cross-section as the first angled surface 48. The first and second angled surfaces 48, 50 both intersect the back surface 44 of the pocket 42 at an acute angle $\alpha'$ as shown in FIGS. 5A and 5B to thereby define the lip member 46. As such, the first and second angled surfaces 48, 50 provide a force, F, (see FIG. 5B) directed against the cutting insert 18 toward the back surface 44 to thereby retain the cutting insert 18 within the pocket 42 during cutting operations as will be described in greater detail below. It should be appreciated that the lip member 46 could be of any suitable shape other than the first and second angled surfaces 48, 50 without departing from the scope of the invention.

As shown in FIGS. 1, 2 and 3, the second angled surface 50 is disposed at a positive angle with respect to the first angled surface 48. As such, the first and second angled surfaces 48, 50 are disposed in a V-shape. As such, the first and second angled surfaces 48, 50 provide transverse retaining forces, F', (see FIG. 1) that are directed transversely relative to the back surface 44 of the pocket 42 to further retain the cutting insert 18 within the pocket 42 as will be discussed in greater detail below.

Figure 4:
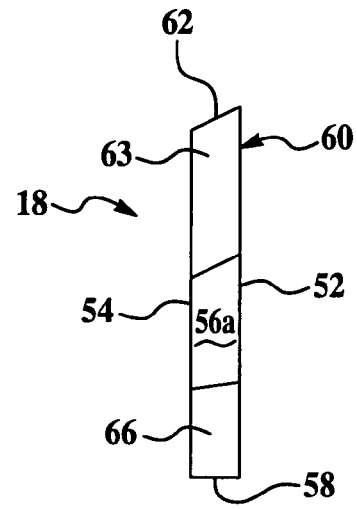
FIG. 4 is a side view of a cutting insert for the gear milling tool of FIG. 1.

FIGS. 1, 4, 5A and 5B show one embodiment of the cutting insert 18. In the embodiment shown, the cutting insert 18 is relatively flat so as to define a front surface 52 and a back surface 54. The cutting insert 18 also includes two opposing side surfaces 56a, 56b. The front surface 52 is generally parallel to the back surface 54, and the side surfaces 56a, 56b are perpendicular to the front and back surfaces 52, 54. The cutting insert 18 also includes a bottom surface 58 which is perpendicular to both the front and back surfaces 52, 54. Also, the cutting insert 18 includes a top surface 63. In the embodiment shown, the top surface 63 is defined as an inverted V-shape with a truncated crest surface 62. Also, the top surface 63 tapers down from the front surface 52 toward the back surface 54 as shown in FIG. 4 such that a cutting edge 60 is defined at the intersection of the top surface 63 and the front surface 52. The cutting insert 18 can be made from a hard metal, such as high speed steel.

The cutting insert 18 also includes a first angled surface 64 and a second angled surface 66. FIGS. 5A and 5B schematically illustrate the first angled surface 64 in cross-section. It should be appreciated that the second angled surface 66 appears the same in cross-section as the first angled surface 64. The first angled surface 64 intersects the back surface 54 at an acute angle α" as shown in FIGS. 5A and 5B. Also, the second angled surface 66 intersects the back surface 54 of the cutting insert 18 as shown in FIGS. 5A and 5B.

When the cutting insert 18 is coupled to the holder 20, the back surface 44 of the pocket 42 supports and abuts against the back surface 54 of the cutting insert 18. Also, the first angled surface 64 abuts against and is supported by the first angled surface 48 of the pocket 42 of the holder 20. Likewise, the second angled surface 66 of the cutting insert 18 abuts against and is supported by the second angled surface 50 of the pocket 42 of the holder 20. In one embodiment, the angle α' is complimentary to the angle α" such that the first and second angled surfaces 64, 66 sit flush against the first and second angled surfaces 48, 50 of the pocket 42, respectively.

Those having ordinary skill in the art will appreciate that the cutting insert 18 may tend to shift during gear milling operations due to cutting forces. However, the cutting insert 18 is sufficiently supported within the pocket 42 of the holder 20 to substantially limit movement of the cutting insert 18 relative to the holder 20. More specifically, if cutting forces act on the cutting insert 18 and attempt to move the cutting insert 18 away from and normal to the back surface 44 of the pocket 42, the first and second angled surfaces 48, 50 will supply a reactive force, F, against the first and second angled surfaces 64, 66 of the cutting 18 as shown in FIG. 5B to retain the cutting insert 18 against the back surface 44 of the holder 20. Likewise, if cutting forces attempt to shift the cutting insert 18 in a transverse direction relative to the back surface 44 of the pocket 42, the first and second angled surfaces 48, 50 of the holder 20 will supply a reactive force, F', transverse to the back surface 44 against the first and second angled surfaces 64, 66 of the cutting insert 18 as shown in FIG. 1 to limit movement of the cutting insert 18 in this direction. Therefore, the cutting insert 18 is better retained within the holder 20, and the gear milling tool assembly 10 is more likely to remain within tolerance.

The cutting insert 18 can be coupled to the holder 20 in any suitable manner. In the embodiment shown, each cutting tool assembly 14 includes a fastener 68 as shown in FIGS. 5A and 5B. In the embodiment shown, the fastener 68 extends through an aperture 70 of the cutting insert 18 and aperture 72 of the holder 20. In one embodiment, the aperture 70 extends through the cutting insert 18 normal to the front surface 52 and the back surface 54. Also, in one embodiment, the aperture 72 is threaded and extends normal to the back surface 44 of the pocket 42 toward the back surface 28 of the holder 20. In the embodiment shown in FIG. 1, the fasteners 68 are each disposed above the upper surface 13 of the cutter head 12 and outside the respective slot 16 as shown in FIG. 1 when the cutting tool assembly 14 is coupled to the cutter head 12. As such, the fasteners 68 are accessible even when the holder 20 is coupled to the cutter head 12 for facilitating replacement of the cutting insert 18.

In the embodiment shown, the aperture 70 of the cutting insert 18 is countersunk on the front surface 52 so as to define a countersunk surface 74. As shown in FIGS. 5A and 5B, in order to couple the cutting insert 18 to the holder 20, the aperture 70 of the cutting insert 18 is misaligned with the threaded aperture 72 of the holder 20 enough such that the first and second angled surfaces 64, 66 can move past the first and second angled surfaces 48, 50 toward the back surface 44 of the pocket 42. As shown, the fastener 68 can be received in both the aperture 70 of the cutting insert 18 and the aperture 72 of the holder 20 despite the misalignment between the apertures 70, 72. Once the cutting insert 18 has cleared the first and second angled surfaces 48, 50 of the holder 20, the fastener 68 cams against the countersunk surface 74 to move the cutting insert 18 down and into the pocket 42. In other words, the first and second angled surfaces 64, 66 cam down the first and second angled surfaces 48, 50 of the holder 20 as the fastener 68 threads farther into the aperture 72. This camming action ensures that the cutting insert 18 is properly seated within the pocket 42 of the holder for better retention therein.

Turning now to FIGS. 6-9, a second embodiment of the cutting insert 18 and holder 120 are shown where like numerals increased by 100 represent like structure with respect to the embodiment shown in FIGS. 1-4. The holder 120 and the cutting insert 118 are substantially similar to the holder 20 and cutting insert 18 described above. However, in the embodiment shown in FIGS. 6-9, one of the cutting insert 118 and the holder 120 includes a male projecting member 176 and the other includes a female receiving member 178 that receives the male projecting member 176. In the embodiment shown, for instance, the cutting insert 118 includes the female receiving member 178 in the form of a groove that extends substantially along the entire length of the back surface 154. Also, in the embodiment shown, the holder 120 includes the male projecting member 176 in the form of a tongue member that extends outward from the back surface 144 of the pocket 142 and extends from the aperture 172 to the top surface 140. Those having ordinary skill in the art will appreciate that the male projecting member 176 could be of any suitable shape, and the female receiving member 178 could also be of any suitable shape without departing from the scope of the invention.

Thus, when the cutting insert 118 is coupled to the holder 120, the tongue member of the holder 120 is received by the groove of the cutting insert 118. As such, if cutting forces, F', attempt to shift the cutting insert 118 in a transverse direction relative to the back surface 144 of the pocket 142, the male projecting member 176 will abut against the female receiving member 178 of the cutting insert 118 to resist such movement. Those having ordinary skill in the art will appreciate that the cutting insert 118 could include the male projecting member 176, and the holder 120 could include the female receiving member 178 without departing from the scope of the invention.

Turning now to FIGS. 10-13, a third embodiment of the cutting insert 218 and holder 220 are shown where like numerals increased by 200 represent like structure with respect to the embodiment shown in FIGS. 1-4. In the embodiment shown, the holder 220 includes a pocket 242 defined by a back surface 244 and a lip member 246. In the embodiment shown, the lip member 246 is a bottom angled surface 280 that intersects the back surface 244 at an acute angle, α', as represented in FIG. 5A. The cutting insert 218 includes a bottom angled surface 282 that intersects the back surface 254 of the cutting insert 218 at an acute angle, α". The bottom angled surface 282 is generally perpendicular to the side surfaces 256a, 256b of the cutting insert 218. The bottom angled surface 218 is generally complimentary to the bottom angled surface 280 of the holder 220 such that the bottom angled surfaces 280, 282 abut against each other when the cutting insert 218 is coupled to the holder 220. Also, the cutting insert 218 includes a female receiving member 278 in the form of a groove, and the holder 220 includes a male projecting member 276 in the form of a tongue member that is received within the female receiving member 178 of the cutting insert 218. Like the embodiments disclosed above, the cutting insert 218 is securely supported and retained within the pocket 242 of the holder 220 such that the cutting tool assembly 214 is more likely to remain within tolerance.

The description of the invention is merely exemplary in nature and thus, variations that do not depart from the gist of the invention are intended to be within the scope of the invention. Such variations are not to be regarded as a departure from the spirit and scope of the invention.

What is claimed is:

1. A cutting tool assembly adapted to be coupled to a cutter head for manufacture of a gear, the cutting tool assembly comprising:
   a cutting insert; and
   a holder adapted to couple the cutting insert to the cutter head and including a pocket defined by a back surface and at least one lip member that provides a force directed against the cutting insert toward the back surface to thereby retain the cutting insert within the pocket during cutting operations, wherein the holder includes a first end and a second end, wherein the first end is adapted to be coupled to the cutter head and includes a front surface, wherein the second end includes the pocket, and wherein the back surface of the pocket is disposed at an acute angle relative to the front surface of the first end.

2. The cutting tool assembly of claim 1, wherein the lip member includes at least one angled surface that intersects the back surface of the holder at an acute angle such that the angled surface provides the force directed against the cutting insert toward the back surface to thereby retain the cutting insert within the pocket.

3. The cutting tool assembly of claim 2, wherein the holder comprises a first angled surface and a second angled surface that is disposed at a positive angle with respect to the first angled surface so as to limit movement of the cutting insert in a direction substantially transverse to the back surface.

4. The cutting tool assembly of claim 2, wherein the holder comprises a bottom angled surface and wherein the insert cutter has a complimentary bottom angled surface that abuts against the bottom angled surface of the holder.

5. The cutting tool assembly of claim 1, wherein the cutting insert includes an aperture and wherein the holder includes an aperture, and further comprising a fastener that extends through the aperture of the cutting insert and the aperture of the holder to thereby couple the cutting insert and holder, wherein the aperture of the cutting insert includes a countersunk surface and wherein the fastener cams the countersunk surface to move the cutting insert into the pocket when coupling the cutting insert and the holder.

6. The cutting tool assembly of claim 1, wherein one of the cutting insert and the holder includes a surface from which a male projecting member projects, and the other of the cutting insert and the holder includes a recess that receives the male projecting member.

7. A cutting tool assembly adapted to be coupled to a cutter head for manufacture of a gear, the cutting tool assembly comprising:
   a cutting insert with a back surface and at least one angled surface intersecting the back surface at an acute angle; and
   a holder having a holder front surface and an opposing holder back surface and adapted to couple the cutting insert to the cutter head and including a pocket opening at the holder front surface and defined by a pocket back surface substantially parallel to the holder back surface and at least one angled surface extending from the holder front surface toward the pocket back surface and intersecting the pocket back surface at an acute angle;
   wherein the pocket back surface supports the back surface of the cutting insert, and wherein the angled surface of the pocket supports the angled surface of the cutting insert by providing a force directed against the cutting insert toward the pocket back surface to thereby retain the cutting insert within the pocket during cutting operations.

8. The cutting tool assembly of claim 7, wherein the holder comprises a first angled surface and a second angled surface that is disposed at a positive angle with respect to the first angled surface so as to limit movement of the cutting insert in a direction substantially transverse to the pocket back surface.

9. The cutting tool assembly of claim 7, wherein the holder pocket comprises a bottom angled surface and wherein the cutting insert has a complementary bottom angled surface that abuts against the bottom angled surface of the holder pocket.

10. The cutting tool assembly of claim 7, wherein the cutting insert includes an aperture and wherein the holder includes an aperture, and further comprising a fastener that extends through the aperture of the cutting insert and the aperture of the holder to thereby couple the cutting insert and holder, wherein the aperture of the cutting insert includes a countersunk surface and wherein the fastener cams the countersunk surface to move the cutting insert into the pocket when coupling the cutting insert and the holder.

11. The cutting tool assembly of claim 7, wherein one of the cutting insert and the holder includes a male projecting member and the other of the cutting insert and the holder includes a female receiving member that receives the male projecting member.

12. The cutting tool assembly of claim 7, wherein the holder includes a first end and a second end, wherein the first end is adapted to be coupled to a cutter head and includes the holder front surface, wherein the second end includes the pocket, and wherein the pocket back surface is disposed at an acute angle relative to the holder front surface of the first end.

13. A gear milling tool assembly comprising:
   a cutter head;
   a plurality of cutting inserts, each with a back surface and at least one angled surface intersecting the back surface at an acute angle; and
   a plurality of holders, each having a holder front surface and an opposing holder back surface and with a pocket opening of the holder front surface and defined by a pocket back surface substantially parallel to the holder back surface and at least one angled surface extending from the holder front surface toward the pocket back surface and intersecting the pocket back surface at an acute angle;
   wherein each of the holders couples one of the cutting inserts to the cutter head and wherein the back surface of each of the pockets supports a corresponding one of the back surfaces of the cutting inserts, and wherein each of the angled surfaces of the pockets supports a corresponding one of the angled surfaces of the cutting inserts by providing a force directed against the corresponding cutting insert toward the back surface to thereby retain the cutting insert within the pocket during cutting operations.

14. The gear milling tool assembly of claim 13, wherein each of the holders comprises a first angled surface and a second angled surface that is disposed at a positive angle with respect to the first angled surface so as to limit movement of the respective cutting insert in a direction substantially transverse to the respective pocket back surface.

15. The gear milling tool assembly of claim 13, wherein each of the holder pockets comprises a bottom angled surface and wherein each of the cutting inserts has a complementary bottom angled surface that abuts against the bottom angled surface of the respective holder pocket.

16. The gear milling tool assembly of claim 13, further comprising a plurality of fasteners each removably coupling one of the cutting inserts to one of the holders, wherein the cutter head includes an upper surface and a plurality of slots, wherein the holders are each disposed in one of the slots to thereby couple, the cutting inserts to the cutter head, and wherein the fasteners are each disposed above the upper surface of the cutter head and outside the slot.

17. The gear milling tool assembly of claim 13, wherein each of the cutting inserts includes an aperture and wherein each of the holders includes an aperture, and further comprising a plurality of fasteners that extend through one of the apertures of the cutting inserts and through one of the apertures of the holders to thereby couple one of cutting inserts and one of the holders, wherein the apertures of the cutting inserts each include a countersunk surface and wherein the fasteners cam the countersunk surfaces to move the corresponding cutting insert into the pocket when coupling the cutting insert and the holder.

18. The gear milling tool assembly of claim 13, wherein one of the plurality of cutting inserts and the plurality of holders each includes a male projecting member, and wherein the other of the plurality of the cutting inserts and the plurality of holders each includes a female receiving member that receives the respective male projecting member.

* * * * *